United States Patent
Grau et al.

(10) Patent No.: US 12,126,032 B2
(45) Date of Patent: Oct. 22, 2024

(54) METHOD FOR FORMING METAL COMPOSITE FILMS FOR BATTERY CELLS

(71) Applicant: VOLKSWAGEN AKTIENGESELLSCHAFT, Wolfsburg (DE)

(72) Inventors: Frederik Grau, Braunschweig (DE); Kartik Jamadar, Wolfsburg (DE); Christian Theuerkauf, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/150,459

(22) Filed: Jan. 15, 2021

(65) Prior Publication Data
US 2021/0226282 A1 Jul. 22, 2021

(30) Foreign Application Priority Data
Jan. 17, 2020 (DE) ...................... 10 2020 101 088.5

(51) Int. Cl.
*B21D 26/14* (2006.01)
*H01M 50/102* (2021.01)
*H01M 50/119* (2021.01)
*H01M 50/124* (2021.01)

(52) U.S. Cl.
CPC .......... *H01M 50/102* (2021.01); *B21D 26/14* (2013.01); *H01M 50/119* (2021.01); *H01M 50/124* (2021.01); *H01M 2220/20* (2013.01)

(58) Field of Classification Search
CPC .. B21D 26/023; B21D 26/027; B21D 26/021; B21D 26/14
See application file for complete search history.

(56) References Cited

U.S. PATENT DOCUMENTS

| 4,266,416 A | 5/1981 | Festag et al. |
| 5,823,032 A | 10/1998 | Fischer |
| 6,564,605 B1 | 5/2003 | Gafri et al. |
| 2004/0200550 A1* | 10/2004 | Pfaffmann ............. B21D 37/16 148/526 |

(Continued)

FOREIGN PATENT DOCUMENTS

| CN | 103962437 A | 8/2014 |
| CN | 109590405 A | 4/2019 |

(Continued)

OTHER PUBLICATIONS

Office Action for Chinese Patent Application No. 202110061135.9, issued Sep. 15, 2022.

(Continued)

*Primary Examiner* — Debra M Sullivan
(74) *Attorney, Agent, or Firm* — PEARL COHEN ZEDEK LATZER BARATZ LLP

(57) ABSTRACT

A method for forming a metal composite film for battery cells includes at least the following steps: (a) inserting the metal composite film into a forming apparatus having a recess; (b) fixing the metal composite film in place by closing a film holder; (c) preforming the metal composite film within the recess in a first direction; and (d) final forming of the metal composite film within the recess in a second direction.

6 Claims, 6 Drawing Sheets

(56) References Cited

U.S. PATENT DOCUMENTS

2009/0145192 A1  6/2009  Friedman et al.
2017/0095855 A1  4/2017  Niaraki et al.

FOREIGN PATENT DOCUMENTS

| DE | 28 25 821 A1 | 10/1979 | |
|---|---|---|---|
| DE | 4134596 A1 * | 4/1993 | ............ B21D 26/02 |
| DE | 4436437 A1 * | 4/1996 | ............ B21D 26/02 |
| DE | 19624036 A1 | 12/1997 | |
| DE | 10028804 A1 * | 12/2001 | ............ B21D 26/02 |
| DE | 10164662 A1 | 7/2003 | |
| DE | 10 2005 050868 A1 | 6/2006 | |
| DE | 10 2007 054 679 A | 5/2009 | |
| DE | 10 2011 003 548 A1 | 8/2012 | |
| EP | 2457674 A1 | 5/2012 | |
| GB | 2017558 A * | 10/1979 | ............ B29C 51/06 |
| WO | WO 01/43947 A1 | 6/2001 | |

OTHER PUBLICATIONS

Search report for German Patent Application No. 10 2020 101 088.5, mailed Sep. 23, 2020.

* cited by examiner

METHOD FOR FORMING METAL COMPOSITE FILMS FOR BATTERY CELLS

CROSS REFERENCE TO RELATED APPLICATION

This application claims priority from German Patent Application No. 10 2020 101 088.5, filed Jan. 17, 2020, the entire contents of which is incorporated herein by reference.

FIELD OF THE INVENTION

The present invention relates to a method for forming a metal composite film for battery cells as well as to battery cells manufactured in accordance with this method. In particular, the present invention relates to the preforming and final forming of aluminum composite films for high-capacitance battery cells by compressed air and electromagnetic pulses.

BACKGROUND OF THE INVENTION

Manufacturing battery cells requires that metal composite films be subject to a shaping processing to enable them to form receiving chambers for battery cells having a high power density. This generally requires forming the metal composite films. In this regard, pouch films, for example, which are produced from a composite of aluminum and plastic, are known in the related art. At least one relatively thin aluminum layer is thereby bonded to other flexible plastic layers. However, such aluminum laminate films have poor deep drawability, so that cracks and folds repeatedly occur when these films are formed for enclosures, respectively casings of cell stacks. This is critical because the battery cells made up of electrodes and separators must be securely encased; however, in the highly stressed, i.e., heavily deformed areas, the encasing pouch films can be repeatedly damaged.

Moreover, present-day, high-capacitance battery cells require that a largest possible number of electrodes be provided in the particular cell stack of the battery cell, which are then encased together by the metal composite film. To this end, it is necessary that the metal composite film be formed as deeply as possible. However, the deeper this forming of the composite metal film turns out to be, the greater is the thinning of material in the critical areas, whereby damage occurs.

If a customary forming tool is used for forming the metal composite film, the thinning of material then occurs, in particular in the punch radii and on webs provided in the tool. Critical areas of this kind often lead to cracks in the composite material films forming in these areas of the casing, thereby endangering the performance reliability of the battery cells.

Thus, different methods for executing the forming of metal composite films are known in the related art. One method provides that a punch be used for the deep-drawing of the films. The punch thereby deforms the metal composite film in the direction of a die, the desired final form of the metal composite film being shaped as a negative form in this die.

However, there are different disadvantages to the approaches known heretofore. Thus, a known approach provides that the aluminum content of the metal composite film be raised to improve the formability, in order to avoid damage, whereby the material costs and the weight of the metal composite film increase, however. Another possible approach provides for forming the metal composite film at elevated temperatures. However, this results in higher process, respectively energy costs.

Finally, another known approach provides that the deep-drawing tool used feature a targeted scraping. However, this is very time-consuming and requires a great deal of experience on the part of the persons carrying out the process.

It is, therefore, an object of the present invention to at least partially resolve the problems arising from the related art. Another aim, in particular, is to provide a method for processing a metal composite film, which will make even substantial deformations of the metal composite film possible without cracks forming or other damage to the metal composite film occurring.

SUMMARY OF THE INVENTION

A method having the features set forth in the independent claim helps ensure that these objectives are achieved. Advantageous embodiments constitute the subject matter of the dependent claims. The features individually specified in the claims may be combined with one another in a technologically useful way and be supplemented by illustrative subject matter from the Specification and/or by the details pertaining to the figures; further variants of the present invention being presented.

In the present case, a method is provided for manufacturing a metal composite film for battery cells, which includes at least the following steps:
 a) inserting the metal composite film into a forming apparatus having a recess;
 b) fixing the metal composite film in place by closing a film holder;
 c) preforming the metal composite film within the recess in a first direction; and
 d) final forming of the metal composite film within the recess in a second direction.

It is preferred that these steps be performed in the aforedescribed sequence a), b), c) and d), but it not being necessary that they immediately (directly) follow each other.

In step a), a metal composite film is first inserted into the forming apparatus. The forming apparatus has a recess through which the metal composite film extends. Here, one side of the recess is configured as a die and has exactly the shape that the metal composite film is intended to have after the deep-drawing process. It is understood here that the recess constitutes a negative form of the desired final, finished form. A special feature of this method step may reside in the metal composite film being placed in the forming apparatus in a way that allows it to be deformed on both sides of the recesses.

In step b), the metal composite film is fixed in place within the forming apparatus by the closing of a film holder. The closing leads, in particular to a clamping of the metal composite film in, respectively on the forming apparatus, respectively in close proximity to the recess. This fixing in place is necessary because, otherwise, the metal composite film would not be securely held within the forming apparatus during the deep-drawing process. The film holder thereby corresponds to the section of a forming tool also designated by the term blank holder in forming and molding technology.

Step c) provides that the metal composite film, thus fixed in place within the tool, be initially deformed in a first direction. This first direction is thereby preferably selected in such a way that it is directed away from the side of the recess which has the final, finished form. At least a portion of the metal composite film is initially moved away from the recess, respectively final-form die. This preforming positively influences the deformation properties of the metal composite film, which proves to be advantageous in the further deep-drawing process.

In step d), the metal composite film is then moved within the recess in a second direction and thereby into the final shape, the final, finished form. The second direction is preferably oriented oppositely to the first direction. Ideally, the metal composite film in this final, finished form forms a pocket, respectively a chamber, which has sufficient space for an efficient battery cell, and the metal composite film used has no damage whatsoever or cracks caused by the deep-drawing process.

The finish-machined and shaped metal composite film may then be removed from the forming apparatus following the thus implemented, at least two-stage, partially reverse deep-drawing process.

For this purpose, the forming apparatus is composed of different components, which will be explained in greater detail in the following. The design of the forming apparatus is thereby dependent on the method selected for the preforming and the final forming.

In particular, it may be provided that the preforming (in particular, in the course of step c) be performed using a positive atmospheric pressure, respectively negative atmospheric pressure, with the assistance of a conventional preforming punch or at least an electromagnetic pulse [EMP]. For this purpose, venting ducts, which connect the recess with the area surrounding the forming apparatus, may be provided to equalize pressure therebetween.

A first preforming variant provides, for example, that the side of the recess have positive pressure applied thereto by the final form/die, so that the positive pressure moves the metal composite film out of this area and thereby forms it into the preform.

To use a positive pressure, the opposite side of the recess may possibly also have a negative pressure correspondingly applied thereto, whereby the same effect of the forming into the preform is achieved.

The preform may also be achieved by a relatively strong electromagnetic pulse. To this end, an electric coil, which may be used to produce an electromagnetic pulse, may be configured on the side of the recess which has the final, finished form. In this regard, a pulsating current may generate a magnetic field in the coil. This magnetic field, in turn, induces a current in the metal composite film. The forces resulting in correspondence with the Lorentz force repel the metal composite film from this coil, move it away very quickly and thereby form it into the preform.

The metal composite film preformed in this manner may then be brought to the final, finished form by a deformation. Again, there are a plurality of technical approaches for this purpose. As already mentioned earlier with reference to the preform, the final, finished form may be achieved by the application of a positive pressure, respectively a negative pressure to the corresponding side of the recess. A further option for bringing the metal composite film into the final, finished form thereof, once it is preformed in the opposite direction, provides that another counteracting electromagnetic pulse be generated, so that the force exerted by the electromagnetic pulse on the metal composite film move the metal composite film toward the side of the recess having the final form/die. To this end, an electrical coil, which is suited for generating an electromagnetic pulse having an oppositely acting Lorentz force, is to be provided on the opposing side.

Finally, the metal composite film may be shaped into the final, finished form by a mechanically acting tool. To this end, a punch, for example, may form the preformed metal composite film into the side of the recess acting as a die and thus bring it into the final, finished form.

In particular, it may thereby be provided that the metal composite film be preformed by a force, which acts in a first direction, and that the final forming be carried out by an exactly opposite force, which acts in a second, respectively substantially opposite direction.

By preforming the pouch film in the opposite direction, more material is brought into the critical zone of the forming being performed. This diminishes the stretching of the material in the direction of the final, finished form, also making deeper drawing possible since more material is available.

It is also especially advantageous that the metal composite film be selected to be formed of an aluminum composite film. Such aluminum composite films are already commercially available today and basically have excellent properties with respect to fatigue strength and the accommodation of battery cells. However, this presupposes that damage to the composite film be avoided during the deep-drawing process, as is made possible by the present invention.

Metal composite film having a thickness of between 120 and 180 micrometers may be used for this purpose, in particular. Films of this kind have the requisite strength and, at the same time, may still be readily formed by the deep-drawing process provided. The present invention applies to all film thicknesses and especially has inherent advantages for thin aluminum layers (of approximately 40 μm) since, during the forming, the aluminum takes material from the layer thickness. For aluminum, the value of anisotropy is less than one.

It is, therefore, especially advantageous that battery cells be manufactured with a metal composite film, which had previously undergone shaping processing in accordance with the previously described method. The advantage of the present invention resides in that the metal composite film processed in this manner is free of damage, such as thinning of material or cracks, and thus ensures a secure and durable encasing of the battery cells.

To achieve the objective, another especially preferred specific embodiment of the present invention provides a forming apparatus for forming a metal composite film for battery cells. The thus designed forming apparatus has a first section and a second section, as well as a film holder for the metal composite film. The first section and the second section, when in a mutually adjoining state, are thereby designed to enclose a recess. Furthermore, the forming apparatus includes a first forming means for forming the metal composite film in a first direction and a second forming means for forming the metal composite film in a second, preferably opposite direction. The previously described coils, air ducts for introducing or discharging air, or mechanical punches having the directions of action specific thereto may be used, for example, as first or second forming means. The thus designed forming apparatus may be used to initially preform the metal composite film in the first direction, and to subsequently finally form it in the second direction. Here, the area of the recess, into which the metal composite film is moved during the particular deformation, preferably has air removed therefrom via at least one air duct, to achieve an unhindered deformation without air jams.

In particular, a motor vehicle of the present invention subsequently benefits when it is equipped with at least one battery cell, which is enclosed by a metal composite film that previously underwent shaping processing in accordance with the method provided.

For the sake of completeness, it is noted that the numerals used here ("first," "second,". . . ) are primarily used to (merely) distinguish among a plurality of substantially identical objects, quantities or processes, thus, in particular, do not stipulate a mutual dependency and/or mutual sequence thereof. Should a dependency and/or sequence be necessary, this is indicated here explicitly, or it becomes apparent to one skilled in the art in studying the specifically described embodiment.

BRIEF DESCRIPTION OF THE DRAWINGS

The present invention, as well as the technical field are explained in greater detail in the following with reference to the enclosed figures. It should be noted that the present invention is not to be limited by the cited exemplary embodiments. In particular, unless explicitly described otherwise, it is also possible to extract partial aspects of the subject matter explained in the figures and combine them with other elements and realizations from the present description. It should be noted, in particular that the figures and, in particular the illustrated relative sizes are only schematic. In the drawing.

DETAILED DESCRIPTION OF THE INVENTION

Figure 1:
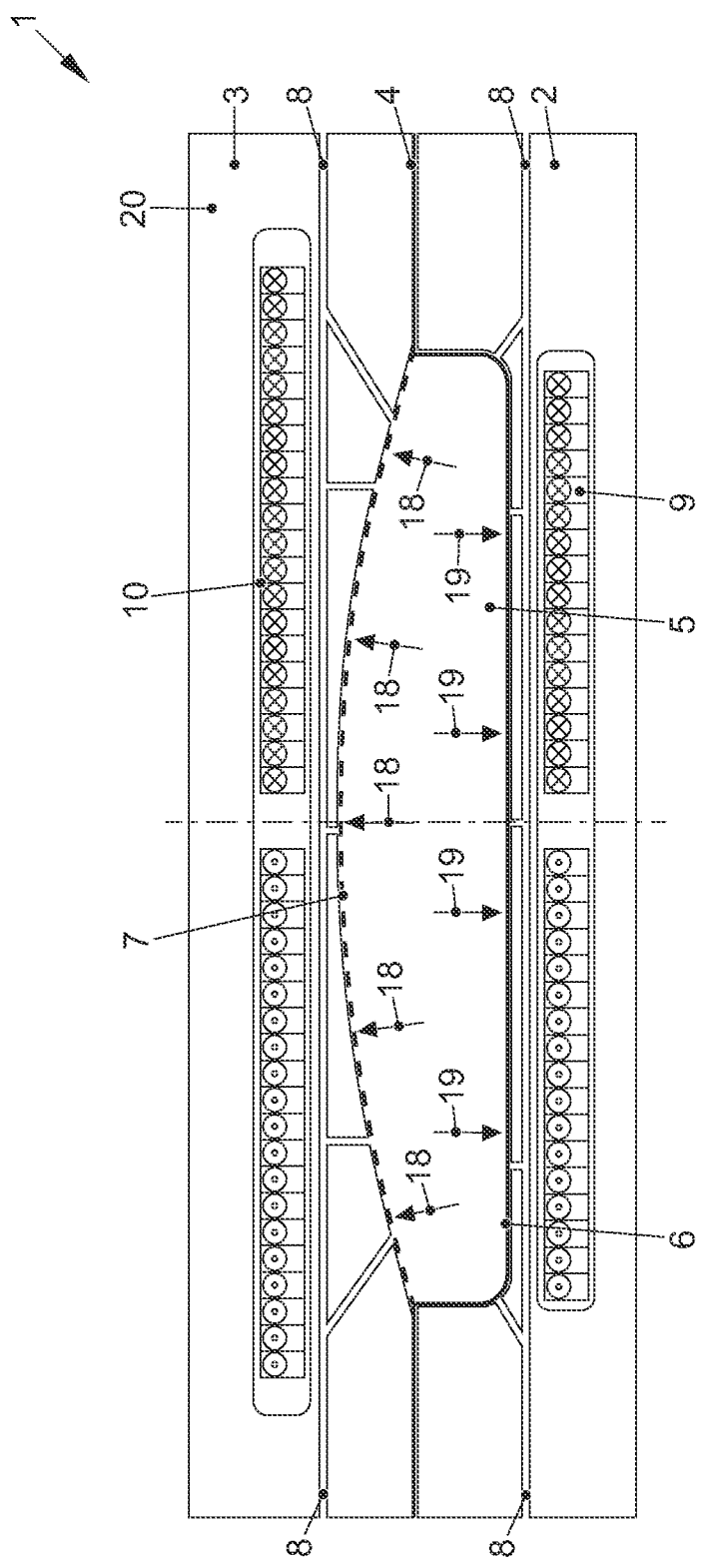
FIG. 1: shows a cross-sectional side view of first design variant of a forming apparatus.

FIG. 1 shows a forming apparatus 1 in a cross-sectional side view. Forming apparatus 1 is composed of a first section 2, which is configured as a die and forms the lower part, as well as of a second section 3, which acts as a film holder 20 and forms an upper part of forming apparatus 1. At the outer rim of forming apparatus 1, a metal composite film 4 is securely clamped in place between first section 2 and second section 3. To that end, first section 2 and second section 3 are pressed securely against each other. Metal composite film 4 is an aluminum composite film, for example, which, as is known, is also referred to as a pouch film. The two sections 2, 3, jointly enclose a recess 5, in which the pouch film is formed into a finished film pocket, a pouch. First section 2 defines that part of recess 5 which forms a final, finished form 6. This means that first section 2 is formed as an exact negative form for the final state of fully formed metal composite film 4. In recess 5 in FIG. 1, the up arrows indicate a first direction 18 and the down arrows a second direction 19.

In response to a deformation in first direction 18, the metal composite film is initially deformed into a preform 7 and, subsequently thereto, in response to a deformation in (opposite) second direction 19, brought to a final, finished form 6.

Figure 6:
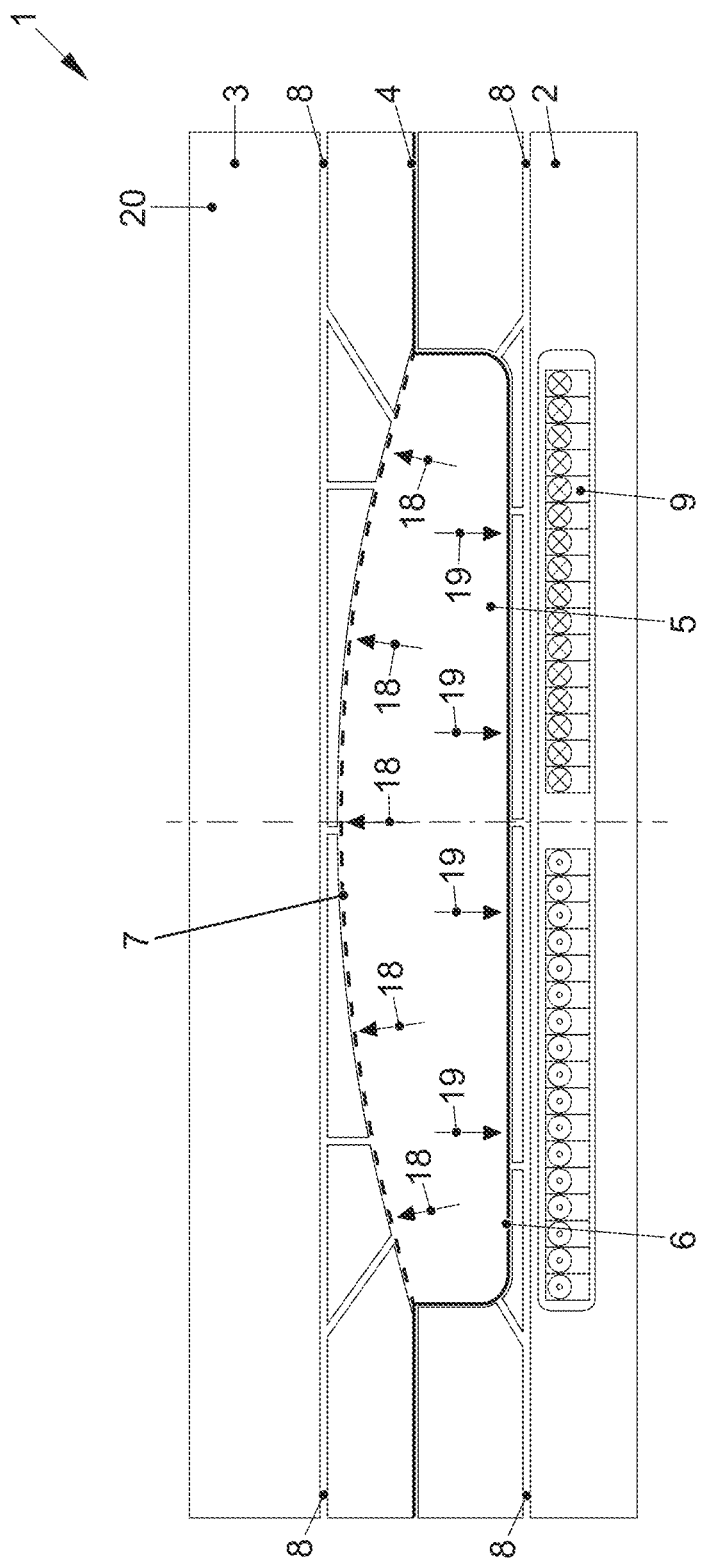
FIG. 6 shows a cross-sectional side view of fifth design variant of a forming apparatus.

The dashed line illustrated inside of recess 5 shows the contour profile of metal composite film 4 having preform 7. This means that the dashed line indicates the contour profile of the metal composite film 4 upon completed preforming. Both first section 2 and second section 3 are each equipped with air ducts 8 which ensure that air is removed from recess 5 both during preforming and during final forming. First section 2 also has a first coil 9 which is designed to emit an electromagnetic pulse as soon as the illustrated conductor of first coil 9 is traversed by a current. First coil 9 is able to generate an electromagnetic pulse, which forms metal composite film 4 upwardly in first direction 18 by the thereby produced Lorentz force that acts on metal composite film 4. There, metal composite film 4 then comes in contact with that section of recess 5 which belongs to second section 3 of forming apparatus 1. To achieve final form 6 of metal composite film 4, second section 3 has a second coil 10, which is likewise designed to emit an electromagnetic pulse, however, in the opposite direction. That is, the Lorentz force produced by coil 10 is transferred at this stage in second direction 19. Once the preforming is carried out, another electromagnetic pulse may be emitted by now above disposed second coil 10, which, in turn, effects the forming into final, finished form 6. During the process of forming into final, finished form 6, metal composite film 4 is pressed downward into recess 5 of first section 2 configured as a die. Reversing the polarity of the current flow makes it likewise possible for only one coil to be used, as shown in the embodiment depicted in FIG. 6. Thus, the direction of the Lorentz force is controllable.

In many respects, there are advantages to the forming by an electromagnetic pulse. Thus, in this manner, a very high process speed of more than 100 m/s, for example, may be reached. This significantly improves the formability of the material used since, for the deformation, it may be brought into a viscoplastic state. Furthermore, the friction that otherwise normally occurs between the punch and the die of a forming tool and the workpiece is avoided by the metal composite film 7 at hand, which is to be formed, being formed without contact. This also makes it possible to considerably lower the energy consumption since there is no need for mechanical drives nor for the energy-consuming generation of compressed air for a pressure-driven forming process. Thus, using compressed air for the forming requires a relatively cost-intensive generation of compressed air, particularly when working with large sizes, which is reflected in higher process costs. Also, the use of controllable valves negatively affects the process times, for example, since they operate relatively slowly. Another advantage of the electromagnetic forming is the shaping of sharp contours. Thus, it is not only possible to produce vertical edges, but also to create undercuts.

The present invention is also able to substantially reduce the wear that forming apparatus 1 is subject to and make possible greater drawing depths than in the related art heretofore. Moreover, an especially uniform distribution of material on formed metal composite film 4 may be achieved by the present invention and, in particular, by the forming by electromagnetic pulses. Other positive secondary effects of the present invention are that it is possible to appreciably shorten the cycle times required for production and substantially reduce the spring-back of the component to be formed that regularly occurs during a forming process.

After this step, the shaping part of the production process is completed, and the finish-formed metal composite film 4 may be removed. The metal composite film, respectively the pouch film is thereby separated during the production process or also subsequently thereto to ensure that the desired final dimensions are adjustable.

Figure 2:
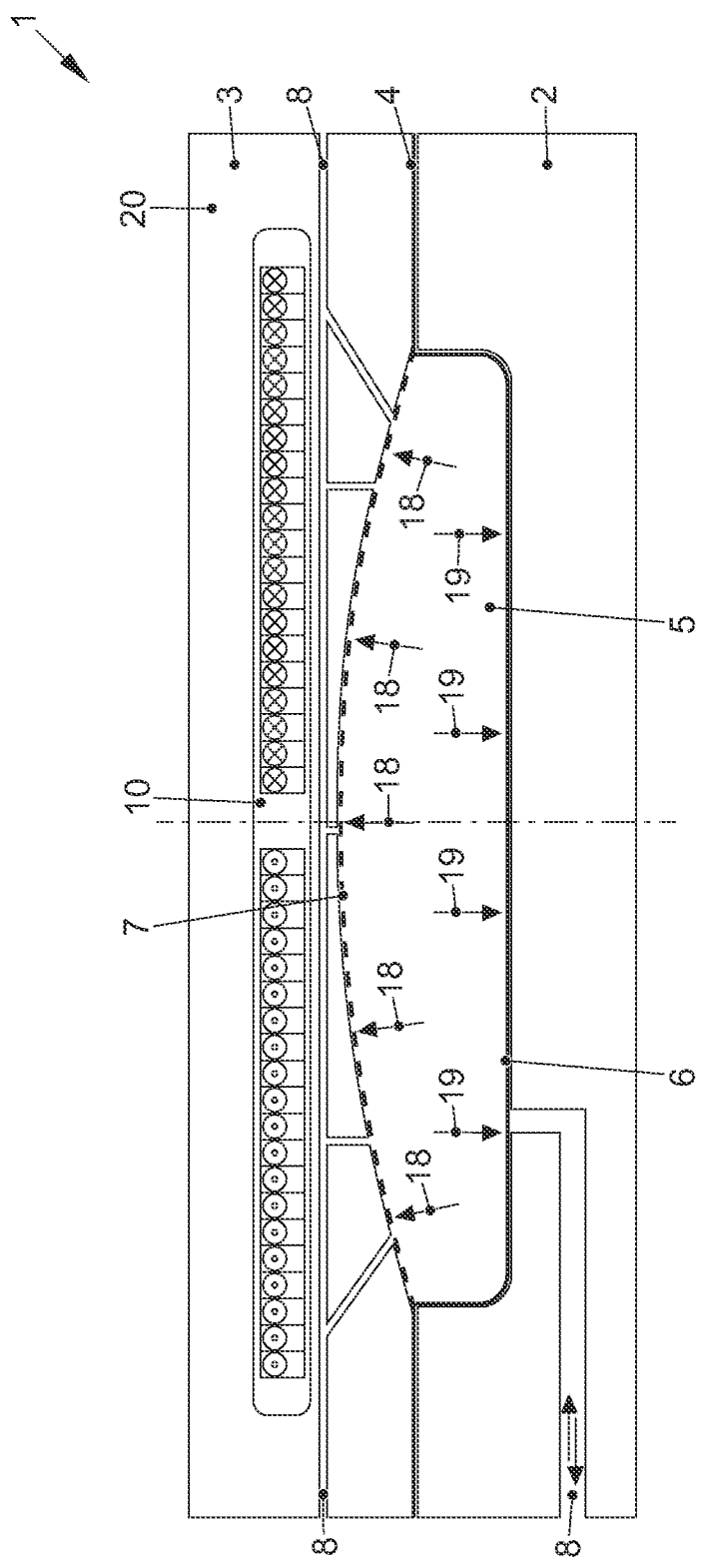
FIG. 2: shows a cross-sectional side view of second design variant of a forming apparatus.

FIG. 2 shows another possible specific embodiment of the present invention. This forming apparatus 1 features coil 10 only in second section 3 that forms the upper part. In this specific embodiment, second section 3 acts as a film holder 20, as it is pressed firmly against underlying first section 2 and thereby securely clamps metal composite film 3 in place in forming apparatus 1. To form metal composite film 4 into preform 7 following the clamping, compressed air is fed through air duct 8, configured at the bottom left, into recess 5, so that, inside of recess 5, metal composite film 4 is initially preformed upwardly in first direction 18. In the subsequent process step, metal composite film 4 located in preform 7, is formed at an especially high speed in second direction 19, downwards into final, finished form 7 by an electromagnetic pulse generated by coil 10 due to the thereby produced Lorentz force. In this specific embodiment, the preforming process is carried out using compressed air, and the final forming process is carried out via an electromagnetic pulse.

In the specific embodiments shown in FIGS. 1 and 2, preform 7, thus the geometry of preformed metal composite film 4, may be precisely defined by the inner contour of second section 3 in the area of recess 5.

Figure 3:
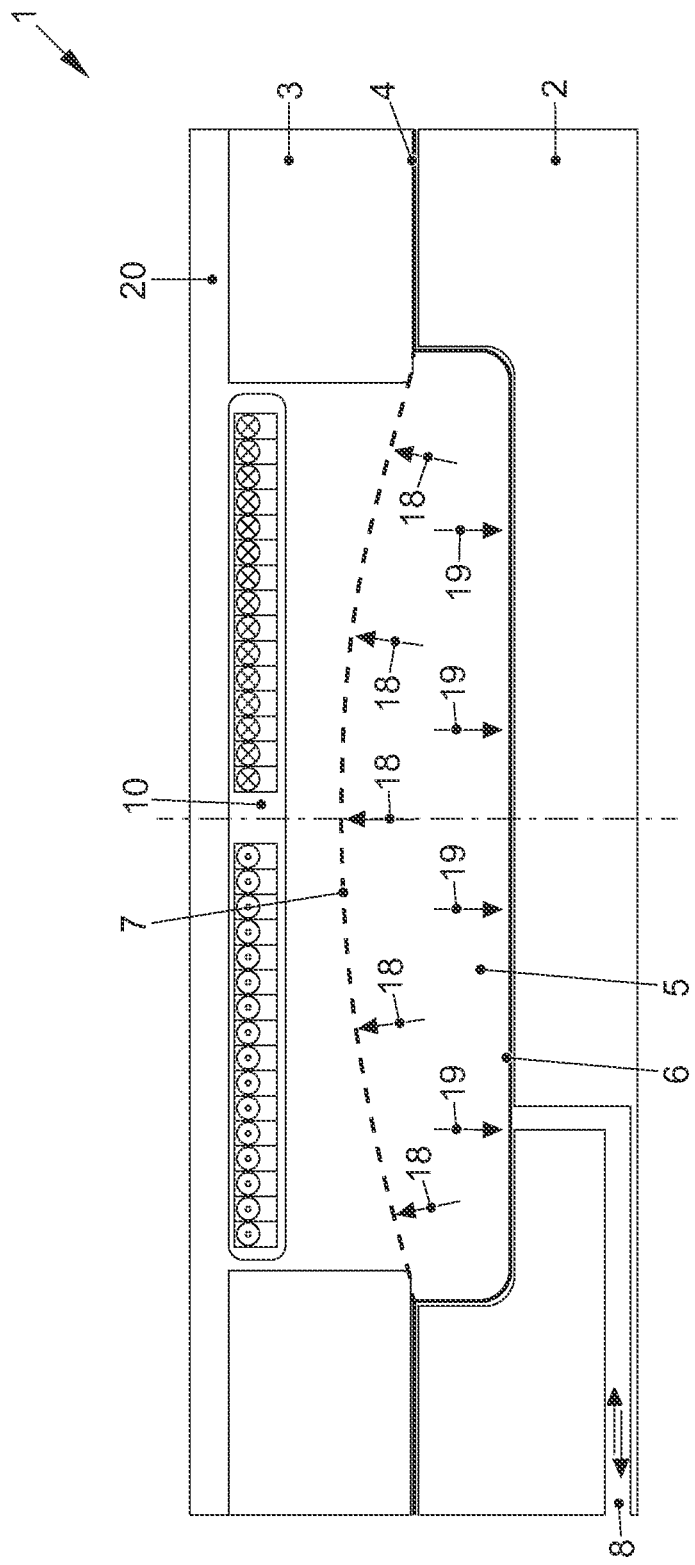
FIG. 3: shows a cross-sectional side view of third design variant of a forming apparatus.

FIG. 3 illustrates another possible specific embodiment of the present invention where first section 2 is again formed as a die and is part of recess 5. Air is supplied to recess 5 and removed therefrom via air duct 8. In this specific embodiment as well, metal composite film 4 is first securely clamped in place within the forming apparatus 1 by second section 3 acting as film holder 20. The special feature of this specific embodiment is that, on the top side, recess 5 no longer has a shaping area, rather is merely covered by coil 10. To place composite film 4 at this stage in preform 7, compressed air is directed via air duct 8, configured at the bottom left, into recess 5, whereby metal composite film 4 is preformed in preform 7 indicated by the dashed line. In this specific embodiment, metal composite film 4 does not come into contact with a shaping area of second section 3. To subsequently place metal composite film 4, preformed in this manner, in preform 6, an electromagnetic pulse is again generated by coil 10. This electromagnetic pulse induces a Lorentz force to act downwardly in second direction 19 on metal composite film 4. Metal composite foil 4 is hereby formed at high speed in the direction of the die of first section 2, thereby assuming the contour of final, finished form 6. Combining preforming and final forming at high speed makes it possible to form metal composite film 4 to a much greater extent than was heretofore the case, without producing damage, such as cracks, for example, on metal composite film 4.

Figure 4:
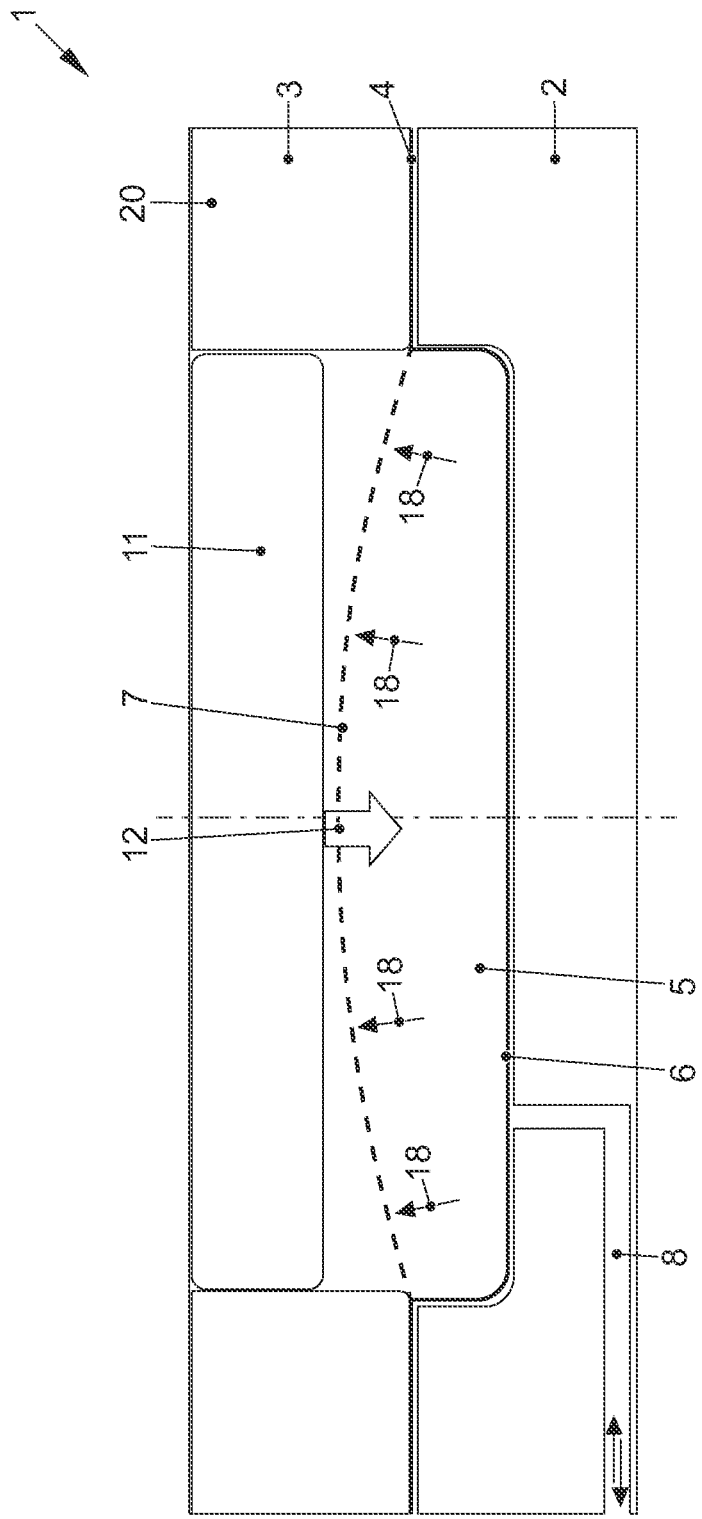
FIG. 4: shows a cross-sectional side view of fourth design variant of a forming apparatus.

FIG. 4 shows another possible specific embodiment of a forming apparatus 1 which is largely constructed in the same way as forming apparatus 1 according to FIG. 3. However, in place of previously used coil 10 in second section 3, this specific embodiment provides a mechanically acting punch 11, which may be moved downwards in the direction of arrow 12. The purpose of this punch 11 is to form metal composite film 4 in final, finished form 6 by mechanical forming, after it has been placed in preform 7 by compressed air fed via air channel 8 in first direction 18. For that purpose, punch 11 is moved downwards into the die of first section 2 by a driving device (not shown) in the direction of arrow 12. The direction of arrow 12 thereby corresponds to second direction 19. In this specific embodiment as well, the combination of preforming and final forming makes it possible to achieve an especially effective deep drawability without damaging metal composite film 4.

In the specific embodiments in accordance with FIGS. 3 and 4, preform 7 is not defined by second section 3. Rather, in these specific embodiments, metal composite film 4 may assume a free contour during the preforming process.

Figure 5:
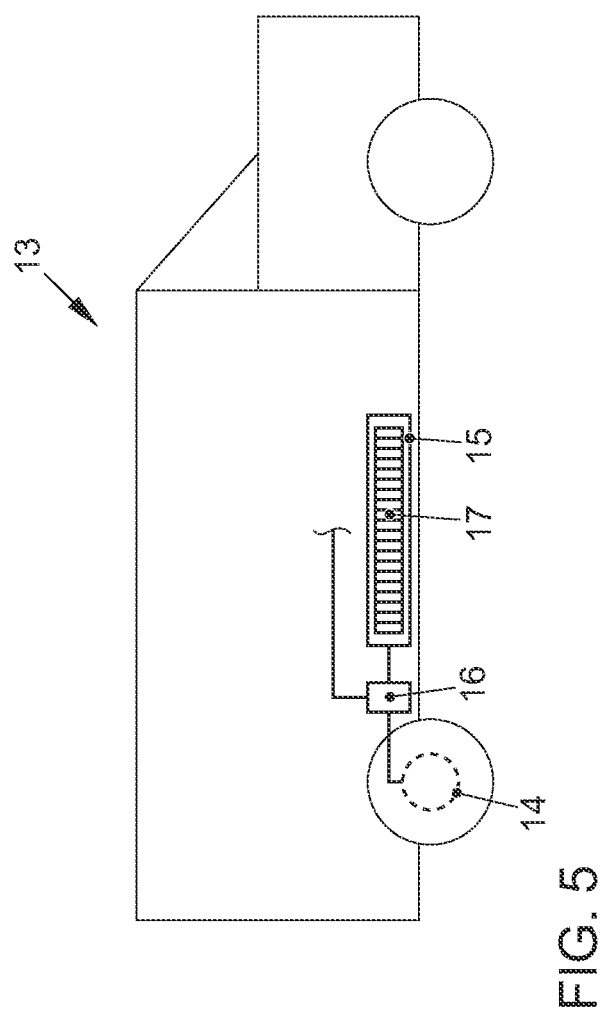
FIG. 5 shows a motor vehicle having battery cells.

Finally, also shown in FIG. 5 is a specific embodiment where a motor vehicle 13 is operated by an electric drive. For that purpose, a schematically illustrated electric motor 14 is powered by a battery 15. The power supply is controlled by a control 16. Disposed within battery 15 are a multiplicity of battery cells 17, which may be produced in accordance with the present invention. A thus designed motor vehicle 13 has the advantage that battery cells 17 located therein are especially reliable as the encasing thereof using metal composite films 4 may be realized without damage and, therefore, extremely reliably and, at the same time, very efficient and reliably encased battery cells may be used.

LIST OF REFERENCE NUMERALS 1 forming apparatus
2 first section
3 second section
4 metal composite film
5 recess
6 final, finished form
7 preform
8 air duct
9 first coil
10 second coil
11 punch
12 arrow
13 motor vehicle
14 electric motor
15 battery
16 control
17 battery cell
18 first direction
19 second direction
20 film holder

The invention claimed is:

1. A method for forming a metal composite film for battery cells,
   comprising at least the following steps:
   a) inserting the metal composite film into a forming apparatus having a first section and a second section that together define a recess, wherein a part of the recess defines a final form, and wherein on at least one side of the recess is mounted an electrical coil configured to emit an electromagnetic pulse;
   b) fixing the metal composite film in place within the recess by closing a film holder;
   c) using at least a first electromagnetic pulse, preforming the metal composite film within the recess in a first direction; and
   d) using at least a second electromagnetic pulse, final forming of the metal composite film within the recess in a second direction that is selected to be opposite to the first direction.

2. The method as recited in claim 1, further comprising removing air from the forming apparatus at least during the preforming or final forming of at least an area of the recess which is disposed behind the metal composite film in the respective deformation direction.

3. The method as recited in claim 1, wherein the metal composite film comprises an aluminum composite film.

4. The method as recited in claim 1, wherein the metal composite film has a wall thickness of between 120 μm and 180 μm.

5. The method as recited in claim 1, wherein an electrical coil configured to emit an electromagnetic pulse is mounted on only one side of the recess, such that the electrical coil emits both the first and the second electromagnetic pulses, wherein the polarity of the second electromagnetic pulse is reversed as compared to the polarity of the first electromagnetic pulse.

6. The method as recited in claim 1, wherein an electrical coil configured to emit an electromagnetic pulse is mounted on both sides of the recess, such that a first electrical coil mounted on a first side of the recess emits the first electromagnetic pulse, and a second electrical coil mounted on a second side of the recess emits the second electromagnetic pulse.

\* \* \* \* \*